US011251983B2

(12) United States Patent
Zhang et al.

(10) Patent No.: US 11,251,983 B2
(45) Date of Patent: Feb. 15, 2022

(54) MEETING ROOM RESERVATION SYSTEM AND RELATED TECHNIQUES

(71) Applicant: Citrix Systems, Inc., Fort Lauderdale, FL (US)

(72) Inventors: Zhifu Zhang, Nanjing (CN); Jin Li, Nanjing (CN)

(73) Assignee: Citrix Systems, Inc., Ft. Lauderdale, FL (US)

( * ) Notice: Subject to any disclaimer, the term of this patent is extended or adjusted under 35 U.S.C. 154(b) by 175 days.

(21) Appl. No.: 16/850,272

(22) Filed: Apr. 16, 2020

(65) Prior Publication Data

US 2021/0288829 A1 Sep. 16, 2021

Related U.S. Application Data

(63) Continuation of application No. PCT/CN2020/079118, filed on Mar. 13, 2020.

(51) Int. Cl.
| | |
|---|---|
| *G06F 15/16* | (2006.01) |
| *H04L 12/18* | (2006.01) |
| *G06F 3/14* | (2006.01) |
| *H04L 9/32* | (2006.01) |
| *G06Q 10/02* | (2012.01) |

(52) U.S. Cl.
CPC ........ *H04L 12/1818* (2013.01); *G06F 3/1454* (2013.01); *G06Q 10/02* (2013.01); *H04L 9/3213* (2013.01)

(58) Field of Classification Search
CPC . H04L 12/1818; H04L 9/3213; H04L 9/3271; G06F 3/1454; G06Q 10/02
See application file for complete search history.

(56) References Cited

U.S. PATENT DOCUMENTS

| | | | |
|---|---|---|---|
| 2016/0139782 A1* | 5/2016 | Scott | H04N 7/15 715/756 |
| 2017/0099361 A1* | 4/2017 | Digilov | H04W 4/023 |
| 2018/0204187 A1 | 7/2018 | Stewart et al. | |

(Continued)

FOREIGN PATENT DOCUMENTS

| | | |
|---|---|---|
| CN | 109034431 | 12/2018 |
| CN | 110728388 A | 1/2020 |
| CN | 110807537 A | 2/2020 |

OTHER PUBLICATIONS

PCT International Search Report and Written Opinion dated Dec. 15, 2020 for International Application No. PCT/CN2020/079118; 9 pages.

*Primary Examiner* — John B Walsh
(74) *Attorney, Agent, or Firm* — Daly, Crowley, Mofford & Durkee, LLP

(57) ABSTRACT

Techniques are disclosed for integrated booking of rooms and media resources, such as display devices. An example methodology implementing the techniques includes responsive to an activation of an access Uniform Resource Locator (URL) on a computing device, receiving information associated with a booking of a room and a display device, generating a token for accessing the display device and providing to the computing device the token and an address of the display device. The method also includes, responsive to receiving the token from the display device, authenticating the token and, responsive to authenticating the token, allowing use of the display device.

20 Claims, 7 Drawing Sheets

(56) References Cited

U.S. PATENT DOCUMENTS

2019/0281092 A1\* 9/2019 Yamada ................ H04L 65/403
2019/0303880 A1\* 10/2019 Hashimoto ........ G06Q 10/1095
2020/0233572 A1\* 7/2020 Healy ................... G06F 3/0416

\* cited by examiner

MEETING ROOM RESERVATION SYSTEM AND RELATED TECHNIQUES

CROSS REFERENCE TO RELATED APPLICATION

This application is a continuation of and claims the benefit of PCT Patent Application No. PCT/CN2020/079118 filed on Mar. 13, 2020 in the English language in the State Intellectual Property Office and designating the United States, the contents of which are hereby incorporated herein by reference in its entirety.

BACKGROUND

Although the proliferation and ease-of-use of electronic communications, such as email and text messaging, have brought about a number of alternatives to communication conducted in traditional conference rooms or other types or rooms or meeting areas (generally referred to herein as meeting rooms), organizations still provide such rooms for conducting meetings among organization members.

To facilitate the efficient sharing and use of meeting rooms, meeting room reservation systems have been developed to allow users to reserve a room in which a meeting may be conducted. For example, a meeting organizer can use a computing device, such as a desktop computer or a mobile device, to access a reservation system and reserve a meeting room for some period of time. The reservation system typically determines meeting room availability from information maintained and retrieved from a meeting room database. As meeting room reservations are processed, the reservation system updates and stores meeting room availability in the meeting room database.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one example embodiment provided to illustrate the broader concepts, systems, and techniques described herein, a method may include, responsive to an activation of an access Uniform Resource Locator (URL) on a computing device, receiving, by a booking system, information associated with a booking of a room and a display device, generating a token for accessing the display device, and providing to the computing device the token and an address of the display device in response to the activation of the access URL. The method may also include, responsive to receiving, by the booking system, the token from the display device, authenticating the token and, responsive to authenticating the token, allowing use of the display device.

In one aspect, allowing use of the display device includes allowing casting to a screen of the display device.

In one aspect, the method may also include, responsive to receiving, by the booking system, the information associated with the booking of the room and the display device, sending to the computing device a challenge-response authentication.

In one aspect, the method may also include receiving, by the booking system, a response to the challenge-response authentication, determining whether the response is a valid response, and responsive to the response being a valid response, providing to the computing device the token and an address of the display device.

In one aspect, providing to the computing device the token and the address of the display device is based on a permission policy.

In one aspect, the method may also include, responsive to receiving, by the booking system, the information associated with the booking of the room and the display device, providing to the computing device information regarding at least one resource associated with the meeting room, the at least one resource being different than the display device.

In one aspect, the method may also include, responsive to failing to authenticate the token, disallowing use of the display device.

In one aspect, the method may also include, responsive to receiving, by the booking system, the information associated with the booking of the room and the display device from the computing device, generating a cast check URL, the cast check URL configured for use in determining whether casting to the display device is to continue, and providing to the computing device the cast check URL.

In one aspect, the access URL is generated by the booking system in response to a booking request for the room, wherein the access URL includes an access code that identifies the room reservation.

According to another illustrative embodiment provided to illustrate the broader concepts described herein, a non-transitory machine-readable medium may encode instructions that when executed by one or more processors cause a process to be carried out. The process may include, responsive to receiving information associated with a booking of a room and a display device caused by activation of an access Uniform Resource Locator (URL) on a computing device, generating a token for accessing the display device and providing to the computing device the token and an address of the display device in response to the activation of the access URL. The process may also include, responsive to receiving the token from the display device, authenticating the token and, responsive to authenticating the token, allowing use of the display device.

In one aspect, allowing use of the display device includes allowing casting to a screen of the display device.

In one aspect, the process may also include, responsive to receiving the information associated with the booking of the room and the display device, sending to the computing device a challenge-response authentication.

In one aspect, the process may also include receiving a response to the challenge-response authentication, determining whether the response is a valid response, and, responsive to the response being a valid response, providing to the computing device the token, an address of the display device, and a cast check URL, the cast check URL configured for use in determining whether casting to the display device is to continue.

In one aspect, the process may also include, responsive to receiving the information associated with the booking of the room and the display device, providing to the computing device information regarding at least one resource associated with the meeting room, the at least one resource being different than the display device.

In one aspect, the process may also include, responsive to failing to authenticate the token, disallowing use of the display device.

According to another illustrative embodiment provided to illustrate the broader concepts described herein, a system includes a memory and one or more processors in communication with the memory. The processor may be configured to, responsive to receipt of information associated with a booking of a room and a display device caused by activation of an access Uniform Resource Locator (URL) on a client application, generate a token for accessing the display device and provide to the client application the token and an address of the display device in response to the activation of the access URL. The processor may be also configured to, responsive to receipt of the token from the display device, authenticate the token and, responsive to authentication of the token, allow casting to a screen of the display device.

In one aspect, the processor may be also configured to, responsive to receipt of the information associated with the booking of the room and the display device, send the client application a challenge-response authentication.

In one aspect, the processor may be also configured to, responsive to receipt of the information associated with the booking of the room and the display, receive a response to the challenge-response authentication, determine whether the response is a valid response, and, responsive to the response being a valid response, provide to the client application the token and an address of the display device.

In one aspect, the processor may be also configured to, responsive to receipt of the information associated with the booking of the room and the display, generate a cast check URL and provide to the client application the cast check URL and, responsive to receipt of the cast check URL from the client application, one of allow continued casting to the display device or terminate casting to the display device.

In one aspect, the processor may be also configured to, responsive to a failure to authenticate the token, disallow casting to the screen of the display device.

BRIEF DESCRIPTION OF THE DRAWINGS

The foregoing and other objects, features and advantages will be apparent from the following more particular description of the embodiments, as illustrated in the accompanying drawings in which like reference numerals refer to the same parts throughout the different views. The drawings are not necessarily to scale, emphasis instead being placed upon illustrating the principles of the embodiments.

DETAILED DESCRIPTION

Figure 1:
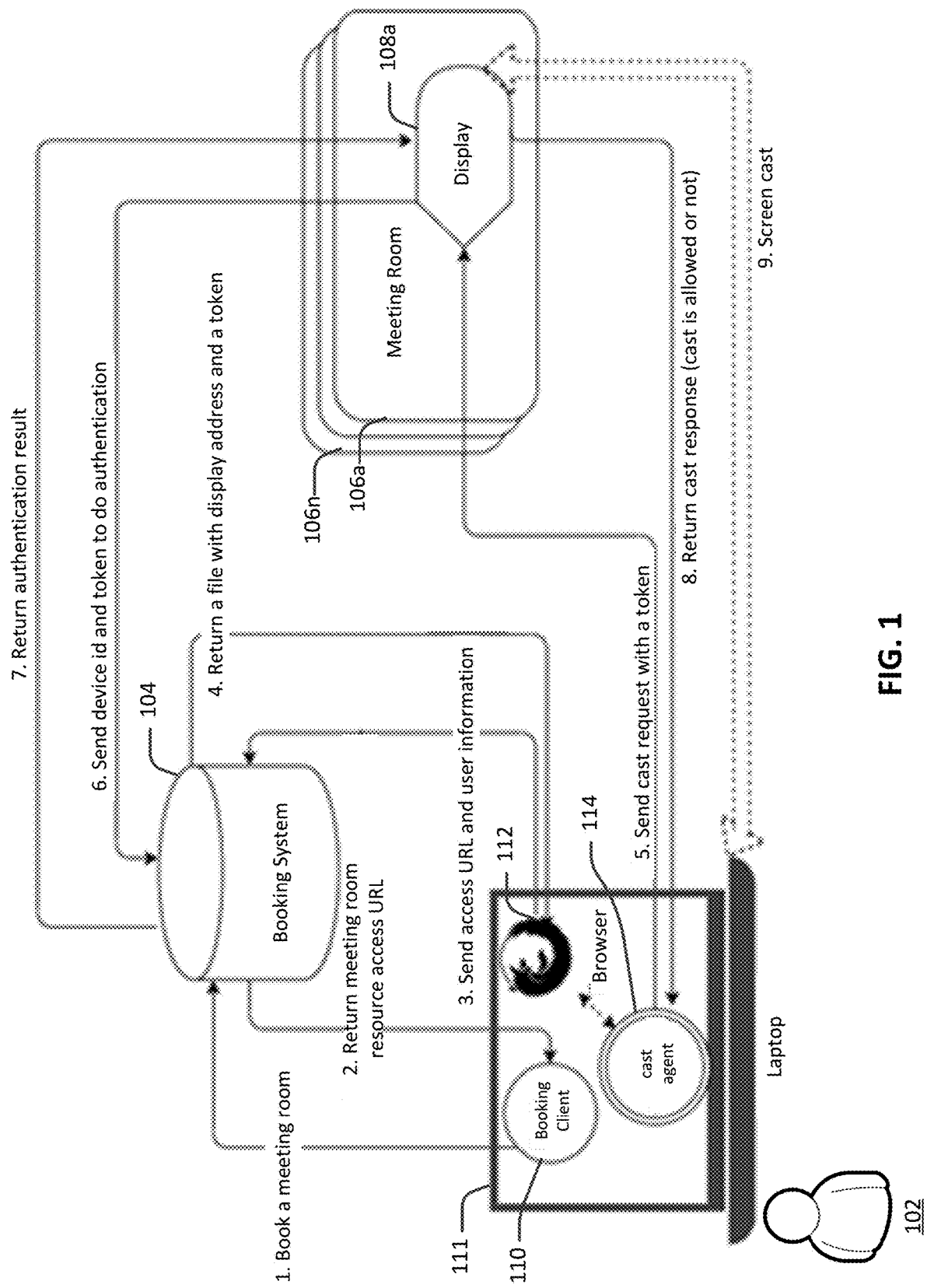
FIG. 1 is a block diagram of an example booking system deployment topology that can be used to reserve and utilize a meeting room, in accordance with an embodiment of the present disclosure.

While simplifying the task of finding and reserving meeting rooms, existing conventional meeting room reservation systems still suffer from certain shortcomings and disadvantages. For example, conventional reservation systems only allow for reserving meeting rooms and not conference media resources (e.g., display devices, projectors, printers, etc . . . ) which may also be used during the meeting. In other words, conventional reservation systems treat the meeting rooms and conference media resources as independent resources, and a meeting organizer typically needs to reserve any needed conference media resource using a management or reservation system which is separate from the meeting room reservation system.

For instance, a meeting organizer may use a meeting room reservation system to reserve a meeting room for a desired period of time. At or prior to the reserved time, the meeting attendees (who may or may not include the meeting organizer) physically enter the reserved meeting room where a conference media resource, such as a display within the meeting room (e.g., a smart TV, a monitor or other type of display device), may have been separately reserved and made available for use during the meeting.

A casting device paired or otherwise associated with a display device enables content from a computing device (e.g., an attendee's computing device) to appear on (i.e., "cast" to) the meeting room display. Thus, to "cast" (or "mirror") content for display on the meeting room display, a meeting attendee (who may or may not be the meeting organizer) may need to activate (turn on) wireless capabilities on his or her computing device to locate a casting device and manually select a desired casting device from a list of available casting devices.

Since there may be numerous casting devices available for connection in the area of the meeting room, the meeting organizer (or attendee) must select and begin communications with the particular casting device associated with the meeting room display. Selecting the incorrect casting device can result in casting (mirroring) the meeting attendees computing device screen to an unexpected and/or undesired display device—e.g., a display device which may be in a different meeting room. Moreover, when leaving the meeting room, (at the conclusion of the meeting, for example), the meeting attendee connected to the display device may forget to turn off the screen casting, thus leaving the contents displayed on the meeting room display device unbeknownst to the meeting attendee.

In accordance with certain of the embodiments disclosed herein, meeting room reservation techniques provide integrated booking of meeting rooms and conference media resources. As used herein, the term "conference media resources" (or "conference media resource" in the singular form) refers to devices and tools that allow meeting participants to collaborate on a topic, for example, by sharing content amongst participants. Nonlimiting examples of conference media resources include computing devices, display devices (e.g., displays such as smart TVs), electronic whiteboards, projection devices, monitors, printers, video conferencing equipment, audio conferencing equipment, audio devices (e.g., a loudspeaker), and telecommunication equipment. In some cases, a conference media resource may be operable for communication over wired and/or wireless networks.

In an embodiment, a booking system provides management of both meeting room resources, such as meeting rooms, and conference media resources, such as displays, located in and/or for use with the meeting rooms. In some example scenarios, a meeting organizer may use the booking system to reserve (or "book") both a meeting room and a display for a meeting. In embodiments, the reserved display may be located in the reserved meeting room.

As used herein, the term "meeting organizer" refers to any person or persons or system using the booking system to reserve one or more meeting rooms and/or one or more conference media resources. In reserving a meeting room for a meeting, the meeting organizer may specify a user identifier (e.g., identification information, such as an email address, phone number, etc.), a date and time (e.g., start time and/or end time) for using the meeting room, and/or a duration of time that the meeting room is to be reserved.

The meeting organizer may also specify one or more permission policies for the reserved meeting room. The one or more permission policies may specify permissions that apply to one, some or all meeting attendees for the reserved conference media resources associated with the meeting room and/or the scheduled meeting. For example, a first permission policy (Permission Policy 1) may specify that anyone is permitted to access the reserved conference media resources (e.g., screen cast), a second permission policy (Permission Policy 2) may specify that anyone who belongs to the organization (i.e., the organization to which the meeting organizer belongs) is permitted to access the reserved conference media resources, and a third permission policy (Permission Policy 3) may specify that the meeting attendees or a subset of the meeting attendees are permitted to access the reserved conference media resources. A meeting organizer may, for example, specify a list of users (i.e., user identification information of the meeting attendees) who are permitted to screen cast to the display.

In some implementations, in addition to enabling one to book a meeting room for a specified day and period of time (i.e., the meeting time), the booking system may also allow a meeting organizer to reserve other resources such as conference media resources, along with the meeting room. Thus, the booking system may be used to book both a meeting room as well as conference media resources which may be used during the meeting time. In this case, the meeting organizer may also specify any permissions associated with the requested resource(s) (e.g., specify the meeting attendee or attendees permitted to use a conference media resource).

In booking the requested meeting room, the booking system generates an access code that identifies the meeting room reservation. For instance, the access code may be a key, such as "123456", that uniquely identifies the meeting room reservation. The booking system also generates an access address, such as a web address (e.g., Uniform Resource Locator (URL)) using the access code. For example, in an implementation, the access code, such as "123456", may be appended to the end of the URL. The access address generated using the access code may be used to identify the meeting room reservation (i.e., the meeting room booking). The booking system can then provide the generated access address to the meeting organizer (i.e., the user reserving the meeting room). The meeting organizer may then share or otherwise provide the meeting room booking information to the meeting attendees to inform the attendees of the reserved meeting room. The meeting organizer may also provide the access address to some or all of the meeting attendees. For example, the meeting organizer may provide the access address to the attendees who may be attending the meeting remotely and/or to the attendees who are provided permission to access or use any of the reserved conference media resources.

At or during the reserved time (e.g., when using the booked meeting room), a meeting attendee who wishes to use a conference media resource can use a computing device to provide the access address to the booking system. For example, suppose a meeting organizer wants to use the display in the meeting room to present a presentation for viewing by the other meeting attendees. In this case, the meeting organizer can provide the access address to the booking system (e.g., via a computing device) to obtain authorization to use the display.

In response to receiving the access address, the booking system can identify the meeting room booking information, including the associated permission policy. The booking system can then optionally authenticate the user sending the access address (in this example, the meeting organizer) using a challenge-response authentication scheme or other suitable authentication method. If the authentication process is successful, the booking system checks the permission policy to determine whether the meeting organizer (i.e., authenticated user) is allowed to access the display. If the check of the permission policy indicates that the meeting organizer is allowed to access the display, the booking system generates a token to authorize access to the display. The booking system then sends the token along with an address, such as a network address, of the display to the meeting organizer. More specifically, the booking system sends the token and the address of the display to the computing device used to send the access address. The booking system may also generate a continued display access check address, such as a cast check URL, and send the continued display access address to the meeting organizer. The continued display access address may be used to determine whether access to the display is to be continued or terminated.

As used herein, the term "token" refers to any type of data that can be used to identify and/or authenticate a trusted client. A token can therefore be understood as identifying a privilege associated with the bearer of the token. For example, in certain embodiments, an authorization token establishes that a particular user is authorized to use a designated display or access an identified conference media resource item. Tokens are often comprised of a randomly generated alphanumeric string of characters that would be difficult to guess using brute force methods. The authenticity of a token generated in this manner can be verified based on a secret, such as a password or other key, thus eliminating any need to store the actual token in a repository. In such embodiments, a client can authenticate itself to a server simply by providing the token to the server, for instance as part of a license request submitted to a key management server. A token can optionally be configured to expire after a specified period of time, after a specified number of uses, or after a certain event has occurred.

To access the display (for the purpose of casting to the display, for example), the meeting organizer sends the token provided by the booking system to the display using the provided address of the display. For example, the meeting organizer can execute a casting agent on a computing device and use the casting agent to send the token with a cast request to the display. Upon receiving the token, the display can authenticate the token with the booking system. If the token is authenticated, the display can allow casting from the computing device (e.g., allow mirroring of the computing device's screen to the display). This approach reduces (and ideally eliminates) the risk of the meeting organizer or an attendee casting to an unintended display device.

During access of the display, the casting agent on the computing device may continually or periodically send the continued display access address to the booking system to check whether it may continue casting (mirroring) to the display. For example, if the casting agent attempts casting past the time the meeting room is booked, the check using the continued display access address may cause the casting agent to terminate the casting to the display. These and other advantages, configurations, modifications, and embodiments will be apparent in light of this disclosure.

Although certain embodiments and/or examples are described herein in the context or meeting rooms and/or reserving meeting rooms, it will be appreciated in light of this disclosure that such embodiments and/or examples are not intended to be and should not be construed as limiting. Rather, the concepts described herein are applicable to rooms having media resources that can be booked. Nonlimiting examples of such rooms having media resources that can be booked include hotel rooms and office and workspaces, to name a few examples.

Additionally, although certain embodiments and/or examples are described herein in the context of a conference media resource being a display, it will be appreciated in light of this disclosure that such embodiments and/or examples are not intended to be and should not be construed as limiting. Rather, the concepts described herein are applicable to media resources in the general sense. In other words, media resources other than displays, such as computing devices, projection devices, and printers, to name a few examples, may be associated with the booking and use of a meeting room. Moreover, the booking system may generate and provide access tokens and continued access addresses for accessing the reserved media resources as is similarly done for a display as variously described herein.

Turning now to the figures, FIG. 1 depicts an illustration of an example booking system deployment topology that can be used to reserve and utilize a meeting room, in accordance with an embodiment of the present disclosure. Such a topology can be understood as a process in which a user 102, such as a meeting organizer, leverages services provided by a booking system 104. To facilitate integrated booking of meeting rooms and conference media resources, such as displays located in the meeting rooms, booking system 104 may maintain a record of the meeting rooms that are managed by booking system 104 and the displays and other conference media resources associated with the managed meeting rooms.

For example, as shown in FIG. 1, booking system 104 may be managing one or more meeting rooms (meeting room 106a-106N) and with each meeting room have an associated display (displays 108a-108N). In embodiments, each of displays 108a-108N are located in a corresponding one of meeting rooms 106a-106N. For example, as depicted in FIG. 1, display 108a may be located in meeting room 106a, and so on. Booking system 104 may maintain booking status information (e.g., available, not available, booked, booking start time, booking end time, booking date, user Id, password associated with the user Id, etc.) for the managed booking rooms that indicate the availability of the meeting rooms for booking.

For example, user 102 sends to booking system 104 a request to book a meeting room, such as meeting room 108a, using a booking client 110 executing on a suitable computing device 111. Booking client 110 enables user 102 to access the services provided by booking system 104. The request may include booking information such as an identifier of user 102, a booking date, a start and an end time for the requested booking, permission policy information, and other conference media resources needed for the meeting. For example, user 102 may request to book meeting room 106a for use from 1 PM to 2 PM on May 1, 2020.

In response to the booking request, booking system 104 returns or otherwise provides to booking client 110 a meeting room resource access URL. The meeting room resource access URL identifies the requested booking of meeting room 106a with which display 108a is associated. The meeting room resource access URL may also serve as a confirmation of the meeting room booking for the requested date and time. Note that booking system 104 may return an error or an indication that the requested meeting room is not available for the specified date and time. For example, booking system 104 may return an error message in cases where the booking status information for meeting room 106a indicates that meeting room 106a is not available at the date and time specified in the request. For example, the meeting room may already be booked for use during all or part of the time between 1 PM to 2 PM on May 1, 2020.

At or during the reserved time (at about 1 PM or between 1 PM and 2 PM on May 1, 2020), user 102 may decide to use the display device (display 108a) located in meeting room 106a to cast the screen of computing device 111 (or other suitable computing device) to a screen of display 108a. To do so, user 102 may run an application, such as a browser application 112, on a suitable computing device, such as computing device 111, and click or otherwise activate the meeting room access URL. This causes computing device 111 and, more particularly, browser application 112 to send to booking system 104 the meeting room resource access URL and user identification information. This causes booking system 104 to return to browser application 112 a file that includes an address of display 108a and a token for use in accessing display 108a.

To mirror the screen of computing device 111 to display 108a, user 102 may run an application, such as a cast agent 114, on computing device 111 or other suitable computing device to send to display 108a a cast request with the token. Upon receiving the cast request and the token, display 108a sends to booking system 104 a device identifier (display 108a identification information) and the token to check the authenticity of the token provided by cast agent 114.

In response thereto, booking system 104 checks the authenticity of the token and returns to display 108a the results of the authenticity check. For example, in the case where the authenticity check indicates that the token is a valid token (e.g., the token was generated and issued by booking system 104), the result returned to the display by the booking system 104 can indicate that the token is authentic and that display 108a may allow casting. In the case where the authenticity check indicates that the token is an invalid token (e.g., the token is not a token generated and issued by booking system 104), the returned result can indicate that the token is not authentic and that display 108a should not allow casting (e.g., should not permit access). In either case, display 108a returns to cast agent 114 an appropriate cast response (e.g., authenticated or un-authenticated) based upon the authentication result provided by booking system 104. If an "authenticated" cast response is provided by display 108a, cast agent 114 can start screen casting to the screen of display 108a. If an "un-authenticated" cast response is provided by display 108a, cast agent 114 can display or otherwise provide an error indication to user 102.

Figure 2:
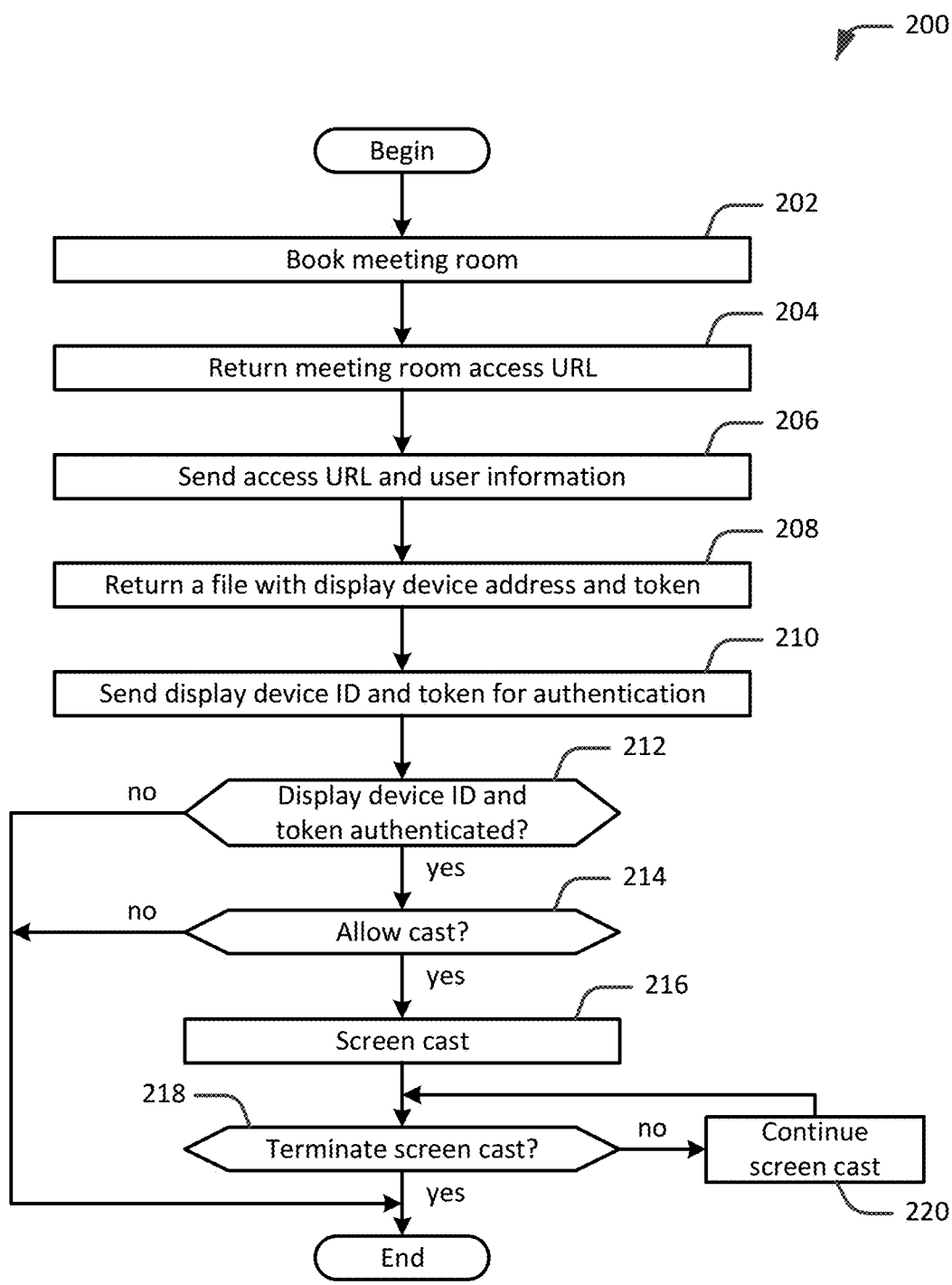
FIG. 2 is a flow diagram illustrating an example process for booking and utilizing a meeting room, in accordance with an embodiment of the present disclosure.

FIG. 2 is a flow diagram illustrating an example process 200 for booking and utilizing a meeting room, in accordance with an embodiment of the present disclosure. As can be seen, process 200 is initiated and, at block 202, a user, such as user 102 of FIG. 1, may use the services of a booking system, such as booking system 104 of FIG. 1, to book a meeting room. At block 204, the booking system may return or otherwise provide the user a meeting room access identifier (e.g., a meeting room URL) that identifies the booking of the requested meeting room. Note that, since the access identifier identifies the booking of the meeting room (i.e., the reservation of the meeting room), the access identifier may also identify the meeting room that is booked.

At block 206, the user may send the meeting room access URL and user information to the booking system. For example, the user may send the access URL and the user information while using the booked meeting room to obtain access and cast to a display device in the meeting room. At block 208, the booking system may return the display device's address and a token for accessing the display device. To access the display device, the user may send a cast request, including the token, to the display device.

At block 210, the display device may send its display device identifier and the token to the booking system for authentication. At block 212, the booking system may proceed to authenticate the display device identifier and the token (e.g., check that the token is a valid token issued by the booking system to authorize access to the display device identified by the display device identifier). As shown in decision block 212, if the token is authenticated then processing proceeds to decision block 214 in which a decision is made as to whether to allow casting to its screen by the user.

If, in decision block 212, a decision is made that the display device ID and/or token are not authenticated, then process 200 may terminate. Similarly, if a decision is made in decision block 214 that casting is not allowed, then process 200 may terminate.

If, in decision block 214, a decision is made to allow casting to the display device screen by a user (e.g., a meeting attendee), then, at block 216, the user may screen cast to the display device. While casting to the display device, decision block 218 and processing block 220 implement a loop in which a check may be continually and/or periodically made with the booking system to determine whether the screen cast is to be continued or terminated. For example, the system may check to determine whether the beginning time of the meeting room reservation has been reached or whether the duration of the meeting room reservation has expired. If a decision is made in decision block 218 to prevent any screen cast from occurring or to terminate any ongoing screen cast, then screen cast is terminated and processing ends. For example, a decision may be made in decision block 218 to that the meeting room reservation time has expired and thus the booking system may instruct or otherwise cause the user to terminate the screen cast. In some embodiments, an authorized user, such as a system administrator, of the booking system may instruct or otherwise cause the termination of the screen cast by the user.

Figure 3:
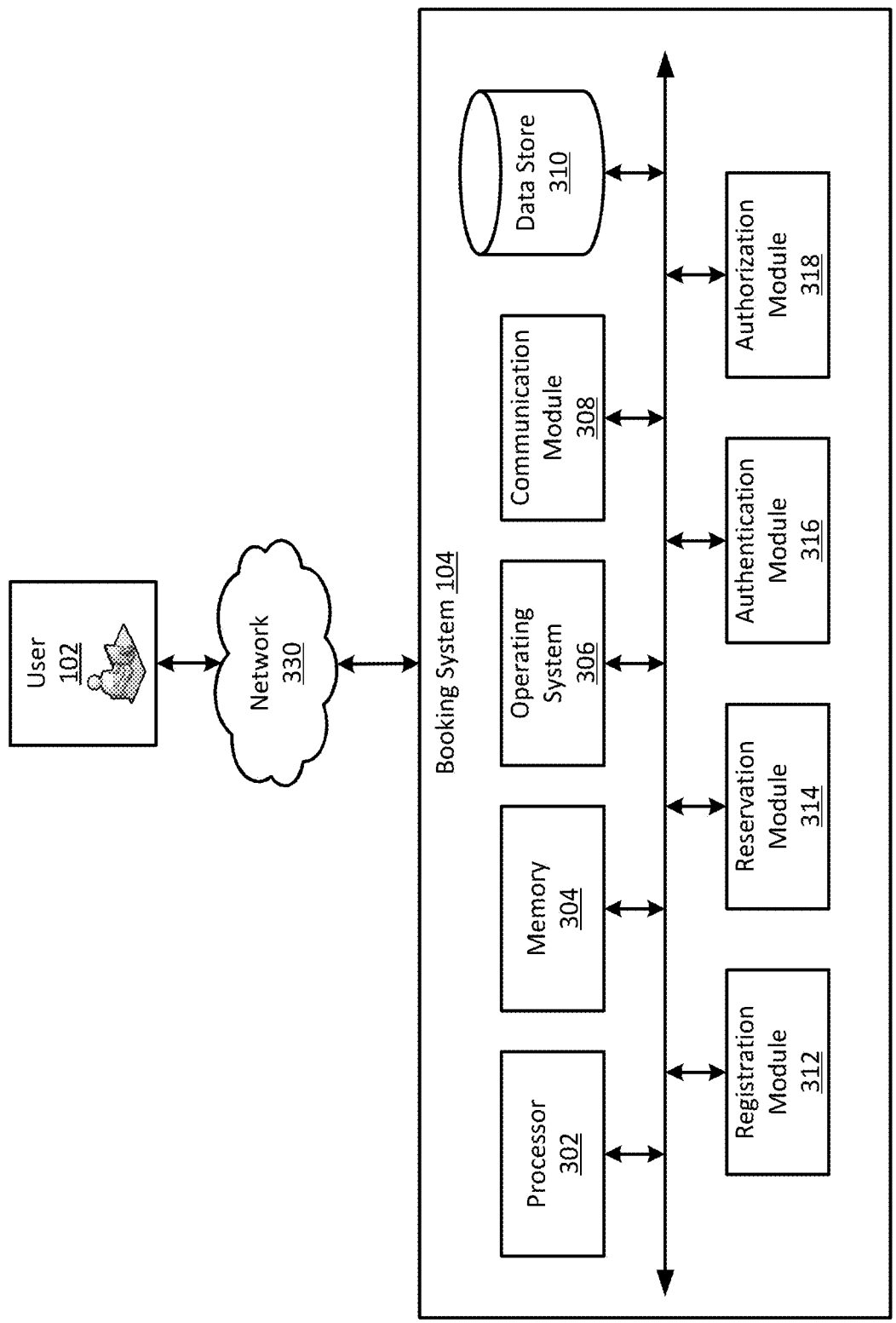
FIG. 3 is a block diagram illustrating selected components of an example networked booking system that can be used to reserve a meeting room, in accordance with an embodiment of the present disclosure.

FIG. 3 is a block diagram illustrating selected components of an example networked computing system that can be used to reserve a meeting room, and/or one or more conference media resources in accordance with an embodiment of the present disclosure. More specifically, the system illustrated in FIG. 3 can be understood as enabling user 102 to leverage the services of booking system 104. For instance, user 102 can use the services of booking system 104 to book a meeting room and one or more conference media resources, such as a display, for example. Once a meeting room and one or more conference media resources are booked, user 102 can use the services of booking system 104 to use the booked conference media resources in conjunction with the booked meeting room (at or during the time of using the booked meeting room).

In such embodiments, user 102 can communicate with booking system 104 via a network 330. Note that the illustrative networked computer system depicted in FIG. 3 is an example only and assumes only a single user. However, it should be understood that the networked computer system depicted in FIG. 3 is easily extended to any number of users and their associated devices for use in reserving meeting rooms and conference media resources in accordance with the techniques described herein. For example, multiple users can leverage the services of booking system 104. It will, therefore, be appreciated that the embodiments disclosed herein are not intended to be limited to the use of booking system 104 by a single user at any one time. It will also be appreciated that the embodiments disclosed herein are not intended to be limited to the use of booking system 104 to reserve meeting rooms and associated conference media resources. Rather, it will be apparent in light of this disclosure that booking system 104 can also be used to access or otherwise utilize conference media resources which were reserved for use in conjunction with the reserved meeting rooms.

Network 330 may be a local area network (such as a home-based or office network), a wide area network (such as the Internet), a peer-to-peer network (such as a Bluetooth connection), or a combination of such networks, whether public, private, or both. In certain embodiments, at least a portion of the functionality associated with network 330 is provided by a cellular data network, thereby making it easier for users of mobile computing devices to leverage the services of booking system 104. In general, communications amongst the various entities and resources described herein may occur via wired or wireless connections, such as may be provided by Wi-Fi or mobile data networks.

As illustrated in FIG. 3, user 102 has access to a device that facilitates interaction with components of booking system 104 illustrated in FIG. 3 or are otherwise described herein. For example, in certain embodiments, user 102 has access to one or more of a variety of suitable computing devices, including devices such as desktop computers, laptop computers, workstations, enterprise class server computers, handheld computers, tablet computers, cellular telephones, smartphones, and set-top boxes. Other devices may be used in other embodiments. The device or devices used by user 102 optionally include a wired and/or wireless communication adapter that enables communication via network 330. The device or devices also optionally include input/output components such as one or more of a tactile keyboard, a display, a touch sensitive display, a microphone, a camera, and location services. Such input/output components allow user 102 to not only control operation of its own device, but also to control certain operational aspects of booking system 104.

Referring still to the example embodiment illustrated in FIG. 3, booking system 104 can be configured to facilitate the integrated booking of meeting rooms and conference media resources. In some embodiments, booking system 104 is also configured to facilitate the use of conference media resources booked in conjunction with the meeting rooms. To this end, in one embodiment, booking system 104 includes one or more software modules configured to implement certain of the functionalities disclosed herein, and optionally further includes hardware configured to enable such implementation. This hardware and/or software may include, but is not limited to, a processor 302, a memory 304, an operating system 306, a communication module 308, and a data store 310.

Processor 302 may be designed to control the operations of the various other components of booking system 104. Processor 202 may include any processing unit suitable for use in booking system 104, such as a single core or multi-core processor. In general, processor 302 may include any suitable special-purpose or general-purpose computer, computing entity, or computing or processing device including various computer hardware, or firmware, and may be configured to execute instructions, such as program instructions, stored on any applicable computer-readable storage media. For example, processor 302 may include a microprocessor, a central processing unit (CPU), a microcontroller, a digital signal processor (DSP), an application-specific integrated circuit (ASIC), a Field-Programmable Gate Array (FPGA), Complex Instruction Set Computer (CISC), Reduced Instruction Set Computer (RISC), multi core, or any other digital or analog circuitry configured to interpret and/or to execute program instructions and/or to process data, whether loaded from memory or implemented directly in hardware. Although illustrated as a single processor in FIG. 3, processor 302 may include any number of processors and/or processor cores configured to, individually or collectively, perform or direct performance of any number of operations described in the present disclosure.

Memory 304 may include computer-readable storage media configured for carrying or having computer-executable instructions or data structures stored thereon. Such computer-readable storage media may include any available media that may be accessed by a general-purpose or special-purpose computer, such as processor 302. By way of example, and not limitation, such computer-readable storage media may include non-transitory computer-readable storage media including Random Access Memory (RAM), Dynamic Random Access Memory (DRAM), Synchronized Dynamic Random Access Memory (SDRAM), Static Random Access Memory (SRAM), non-volatile memory (NVM), or any other suitable storage medium which may be used to carry or store particular program code in the form of computer-executable instructions or data structures and which may be accessed by a general-purpose or special-purpose computer. Combinations of the above may also be included within the scope of computer-readable storage media.

Operating system 306 may comprise any suitable operating system, such as UNIX®, LINUX®, MICROSOFT® WINDOWS® (Microsoft Crop., Redmond, Wash.), GOOGLE® ANDROID™ (Google Inc., Mountain View, Calif.), APPLE® iOS (Apple Inc., Cupertino, Calif.), or APPLE® OS X® (Apple Inc., Cupertino, Calif.). As will be appreciated in light of this disclosure, the techniques provided herein can be implemented without regard to the particular operating system provided in conjunction with booking system 104, and therefore may also be implemented using any suitable existing or subsequently developed platform.

Communication module 308 can be any appropriate network chip or chipset which allows for wired or wireless communication via a network or networks, such as network 330 for instance, to one or more of the other components described herein. Communication module 308 can also be configured to provide intra-device communications via a bus or an interconnect.

Data store 310 may include any type of computer-readable storage media configured for short-term or long-term storage of data. By way of example, and not limitation, such computer-readable storage media may include a hard drive, solid-state drive, Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), non-volatile memory (NVM), or any other storage medium, including those provided above in conjunction with memory 304, which may be used to carry or store particular program code in the form of computer-readable and computer-executable instructions, software or data structures for implementing the various embodiments as disclosed herein and which may be accessed by a general-purpose or special-purpose computer. Combinations of the above may also be included within the scope of computer-readable storage media. Data store 310 may be provided on booking system 104 or provided separately or remotely from booking system 104.

Referring again to the example embodiment illustrated in FIG. 3, booking system 104 further includes a registration module 312, a reservation module 314, an authentication module 316, and an authorization module 318. Registration module 312 is programmed or otherwise configured to provide registration of meeting rooms and conference media resources, such as display devices. For example, in an implementation, registration module 312 may provide a user interface (UI) with which an administrator may register the meeting rooms and the conference media resources that are to be managed by booking system 104. In some such implementations, registration module 312 is configured to process registration requests sent by conference media resources. For example, a conference media resource, such as a display device located in a meeting room, may continuously and/or periodically send a register request that includes its current or valid address (e.g., a network address or URL of the conference media resource). In response, registration module 312 can update the registration records to indicate the current or valid address of the conference media resource. Reservation module 314 is programmed or otherwise configured to provide integrated booking of registered meeting rooms and conference media resources. Authentication module 316 is programmed or otherwise configured to provide authentication services. For example, in an implementation, authentication module 316 may provide authentication of users of booking system 104. Authentication module 316 may also provide authentication of tokens that authorize access to conference media resources. Authorization module 318 is programmed or otherwise configured to determine whether a user, such as an authenticated user, is authorized or permitted to access a conference media resource. Registration module 312, reservation module 314, authentication module 316, and authorization module 318 are further described below at least with respect to FIGS. 4-7.

In various embodiments, additional components or a subset of the illustrated components can be employed without deviating from the scope of the present disclosure. For instance, other embodiments may integrate the various functionalities of the booking system, including the registration module, reservation module, and the authentication module into fewer modules (e.g., one or two) or more modules (e.g., four or five, or more). In addition, further note that the various components of the booking system may be distributed across additional machines. In some cases, the registration module, the reservation module, and/or the authentication module may be downloaded from a server computing system onto a user device for local execution. In some cases, the functionality provided by the registration module, the reservation module, and/or the authentication module may be provided on a server computing system communicatively coupled to the user device. In a more general sense, the degree of integration and distribution of the functional component(s) provided herein can vary greatly from one embodiment to the next, as will be appreciated in light of this disclosure.

The embodiments described herein can be implemented in various forms of hardware, software, firmware, or special purpose processors. For example, in one embodiment, a non-transitory computer readable medium includes instructions encoded thereon that, when executed by one or more processors, cause aspects of booking system 104 described herein to be implemented. The instructions can be encoded using any suitable programming language, such as C, C++, object-oriented C, Java, JavaScript, Visual Basic .NET, BASIC, Scala, or alternatively, using custom or proprietary instruction sets. Such instructions can be provided in the form of one or more computer software applications or applets that are tangibly embodied on a memory device, and that can be executed by a computer having any suitable architecture. In one embodiment, the system can be hosted on a given website and implemented, for example, using JavaScript or another suitable browser-based technology to manage, for example, the integrated booking of meeting rooms and conference media resources described herein.

The functionalities disclosed herein can optionally be incorporated into a variety of different software applications and systems, including room reservation applications, meeting scheduling applications, and conference scheduling applications, to name a few examples. The functionalities disclosed herein can additionally or alternatively leverage services provided by separate software applications and systems. For example, in one embodiment, the functionalities disclosed herein can be implemented in a cloud environment, such as Citrix Cloud™, Microsoft® Azure®, AWS®, Google Cloud™, or any suitable cloud environment. Additionally or alternatively, the functionalities disclosed herein can be implemented using an IaaS framework. The computer software applications disclosed herein may include a number of different modules, sub-modules, or other components of distinct functionality, and can provide information to, or receive information from, still other components and services. These modules can be used, for example, to communicate with input/output devices such as a display screen, a touch sensitive surface, auditory interface, a digital camera, or any other suitable input/output device. Other components and functionality not reflected in the illustrations will be apparent in light of this disclosure, and it will be appreciated that the present disclosure is not intended to be limited to any particular hardware or software configuration. Thus, in other embodiments, the components illustrated in FIG. 3 may include additional, fewer, or alternative subcomponents. Furthermore, in some cases, one or more of the modules and components illustrated in FIG. 3 may be downloaded from a server computing system onto a user device for local execution.

In alternative embodiments, the computers and modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used in this regard, and that the present disclosure is not intended to be limited to any particular system architecture.

Figure 4:
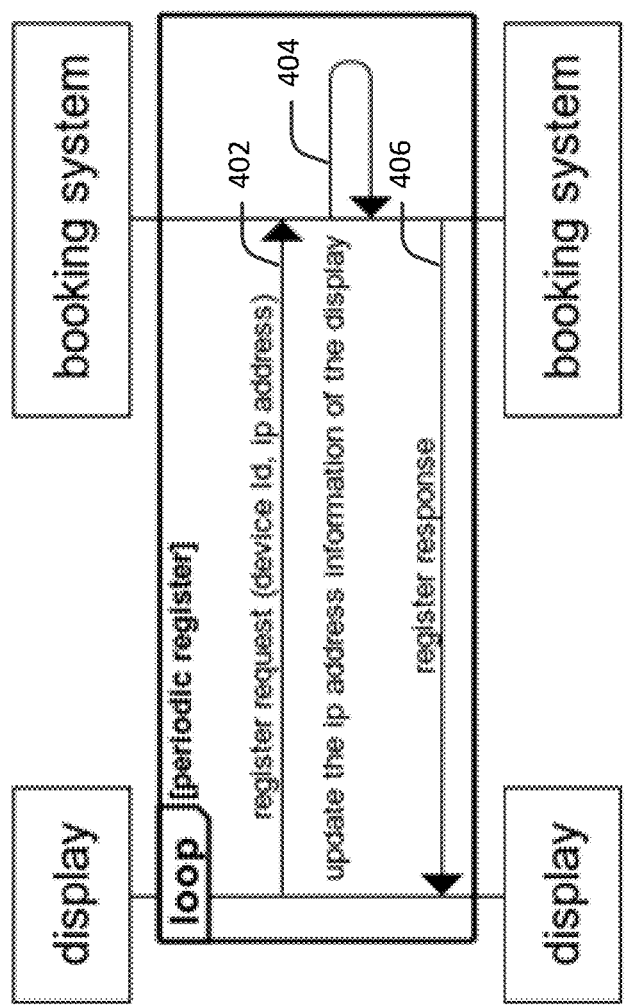
FIG. 4 illustrates an example flow of interactions between various components to register a display device with a booking system, in accordance with an embodiment of the present disclosure.

FIG. 4 illustrates an example flow of interactions between various components to register a display device (e.g., one of display devices 108 in FIG. 1) with a booking system (such as booking system 104 in FIG. 1), in accordance with an embodiment of the present disclosure. For example, the display device may be located in a meeting room whose booking is being managed by booking system 104. Registration of the display device allows booking system 104 to manage the integrated booking of the display device with the booking of the meeting room. For example, the display device may register itself with booking system 104 by sending a register request (402) which may be processed by registration module 312 of booking system 104. The register request may include a device ID and a network address, such as an Internet Protocol (IP) address, of the display device. In response to the register request, registration module 312 updates the network address information for the display device (404). For example, the registration information, including the network address information, may be maintained on data store 310 of booking system 104. Upon successfully updating the network address information, registration module 312 sends to the display device a register response (406) that indicates successful registration of the display device. In an implementation, the display device may continually and/or periodically register with booking system 104. Continually registering with booking system 104 in this manner ensures that booking system 104 maintains a valid network address for the display device.

Figure 5:
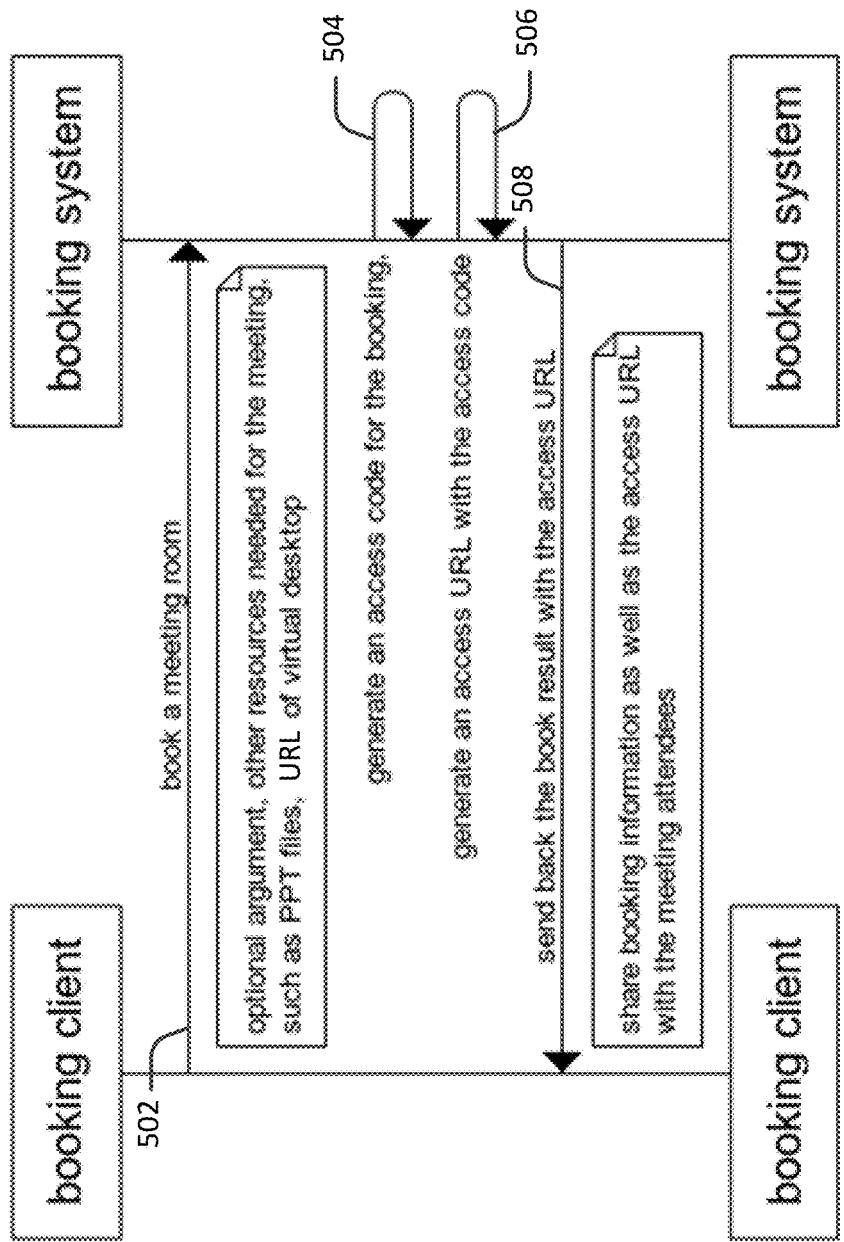
FIG. 5 illustrates an example flow of interactions between various components to book a meeting room using the services of a booking system, in accordance with an embodiment of the present disclosure.

FIG. 5 illustrates an example flow of interactions between various components to book a meeting room using the services of booking system 104, in accordance with an embodiment of the present disclosure. For example, a client application, such as booking client 110, executing on a suitable computing device may provide a UI with which a meeting organizer may book a meeting room via booking system 104. Using the UI, the meeting organizer can provide the meeting organizer's identification information, specify a meeting room, specify the desired date and a start and an end time for the booking, and a permission policy. The meeting organizer may optionally specify the meeting attendees and any other conference media resources, such as, presentation files and URLs of virtual desktops, to provide a couple examples, requested for the meeting (i.e., requested meeting room booking). Once the appropriate information is provided, booking client 110 sends to booking system 104 a request to book the specified meeting room (502). The booking request may be processed by reservation module 314 of booking system 104. In response to the booking request, reservation module 314 may check to determine the availability of the requested meeting room for the specified date and time. If the requested meeting room is available, reservation module 314 may generate an access code that identifies the booking of the requested meeting room (504). Reservation module 314 may then generate an access URL using the access code for the meeting room booking (506). Reservation module 314 may update the booking status information to indicate the booking of the requested meeting room and any other information associated with the booking. For example, the booking status information and other information associated with meeting room bookings may be maintained on data store 310 of booking system 104. Reservation module 314 sends to booking client 110 a response to the booking request. If the booking of the requested meeting room is successful, reservation module 314 sends to booking client 110 a response that indicates a successful booking with the access URL that identifies the meeting room booking (508). If reservation module 314 is unable to book the requested meeting room, reservation module 314 sends to booking client 110 a response that indicates a failure to book the requested meeting room. In any case, the meeting organizer can then share the booking information including the access URL with some or all of the meeting attendees. For example, the meeting organizer may share the access URL with the meeting attendees who have been identified as having permission to access the conference media resource or resources. This allows such meeting attendees to use the access URL gain access to the conference media resource.

Figure 6:
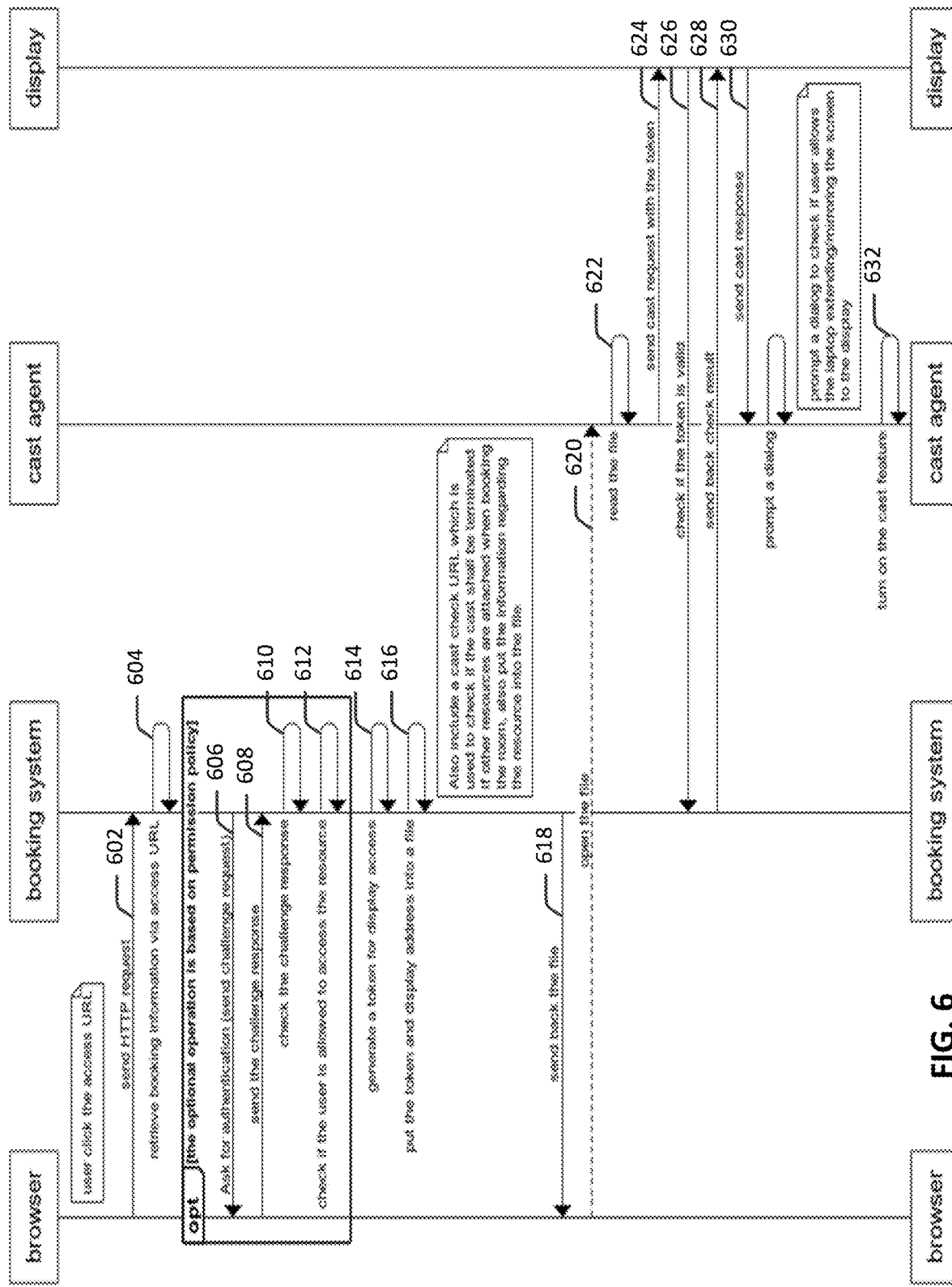
FIG. 6 illustrates an example flow of interactions between selected components of a booking system to allow use of a reserved meeting room, in accordance with an embodiment of the present disclosure.

FIG. 6 illustrates an example flow of interactions between selected components of booking system 104 to allow use of a reserved meeting room, in accordance with an embodiment of the present disclosure. For example, a meeting organizer who booked a meeting room may execute browser application 112 on a suitable computing device to click or otherwise activate the access URL for the meeting room booking. Activating the access URL in this manner may cause browser application 112 to send to booking system 104 an HTTP request (602). Upon receiving the http request, booking system 104 retrieves the meeting room booking information via the access URL (604). For example, the meeting room booking information and other information associated with meeting room bookings may be maintained on data store 310 of booking system 104. In this case, booking system 104 retrieves the meeting room booking information from data store 310.

In an implementation, booking system 104 may optionally authenticate the user that provided the access URL. In some implementations, the optional authentication process may be performed based on the information in the permission policy associated with the meeting room booking. For example, the permission policy may indicate that only the meeting organizer is authorized to access the display device in the meeting room. In this case, authentication module 316 may authenticate the user that provided the access URL to verify the identity of the user. For example, authentication module 316 of booking system 104 may authenticate the user that provided the access URL using a suitable challenge-response authentication. To authenticate the user, booking system 104 sends a challenge request (606) to browser application 110. For example, the challenge request may request that the meeting organizer provide a password, a one time password, an authentication code that is sent to a computing device associated with the meeting organizer, or a CAPTCHA, to name a few examples. Other suitable challenge methods include single sign-on (SSO) or authentication using a smart card. Upon receiving the challenge request, the user can provide an appropriate challenge response, and browser application 110 sends to booking system 104 the challenge response (608) provided by the meeting organizer. Authentication module 316 may check the received challenge response (610) to authenticate the user (i.e., verify the identity of the user) that provided the access URL is the meeting organizer If the authentication is successful (the user is authenticated as the meeting organizer), authorization module 318 of booking system 104 checks the permission policy to determine whether the authenticated user (the meeting organizer in this case) is authorized to access the display device in the meeting room (612). If the permission policy indicates that the authenticated user is authorized to access the display device, booking system 104 generates a token to authorize access to the display device (614). Booking system 104 then places the token in a file along with a network address of the display device (616). In an implementation, booking system 104 may generate and place a cast check URL in the file. If other conference media resources were requested with the meeting room booking, booking system 104 may generate tokens to authorize access to the conference media resources, generate continued access check addresses for the appropriate conference media resources, and place the tokens and the continued access check addresses in the file. Booking system 104 may also include information regarding the other conference media resources, such as addresses, passwords, and other information that may be needed to access the conference media resources, in the file. Booking system 104 then sends to browser application 110 the generated file (618). It will be appreciated in light of this disclosure that the information placed in the file may be based on the information in the permission policy. For example, if the permission policy indicates that the meeting organizer is not authorized to access the display device, booking system 104 does not provide the token that authorizes access to the display device in the file.

The meeting organizer can then use browser application 110 to open the file (620) provided by booking system 104. This may cause a client application, such as cast agent 114, to execute on the computing device and open and read the file (622). Based on the token included in the file, cast agent 114 sends to the display device a cast request with the token retrieved from the file (624). Upon receiving the cast request and the token, the display device sends to booking system 104 a request to check the validity of the token (626). The display device may send its identification information with the request to check the validity of the token to booking system 104. The token validity check request may be processed by authentication module 316 of booking system 104. In response to the token validity check request, authentication module 316 may authenticate the validity of the token. Booking system 104 then sends to the display device the results of the token validity check (628). The display device then sends to cast agent 114 a response to the cast request (630). For example, if the results of the token validity check indicate success, then cast agent 114 sends to cast agent 114 a response that indicates that the token is valid and that cast agent 114 can screen cast to the display device. If the results of the token validity check indicate failure, then cast agent 114 sends to cast agent 114 a response that indicates that the token is invalid and that cast agent 114 is not allowed to screen cast to the display device.

If cast agent 114 receives from the display device a response that indicates that cast agent 114 can screen cast to the display device, cast agent 114 may prompt a dialog (e.g., display a dialog box that prompts the user for input) (632). For example, the dialog may check and confirm that the display device in the meeting room is the display device that the user wants to screen cast to. If the check confirms that the user wants to screen cast to the display device, cast agent 114 can turn on or otherwise activate the screen cast feature (634) on the computing device. This results in the screen of the computing device being mirrored to the screen of the display device. The user can then proceed to use other conference media resources according to the information contained in the file provided by booking system 104.

It will be appreciated in light of this disclosure that a meeting attendee may also activate the access URL to request access to a reserved conference media resource. For example, the meeting organizer may have shared or otherwise provided the access URL to a meeting attendee who has been given permission to access the reserved conference media resource. To access the conference media resource, the meeting attendee may execute a browser application, such as browser application 112, on a suitable computing device to click or otherwise activate the access URL for the meeting room booking. In response, booking system 104 may authenticate the meeting attendee, check the permission policy to determine that the meeting attendee is authorized to access the conference media resource, and send a token to the meeting attendee for use in accessing the conference media resource.

Figure 7:
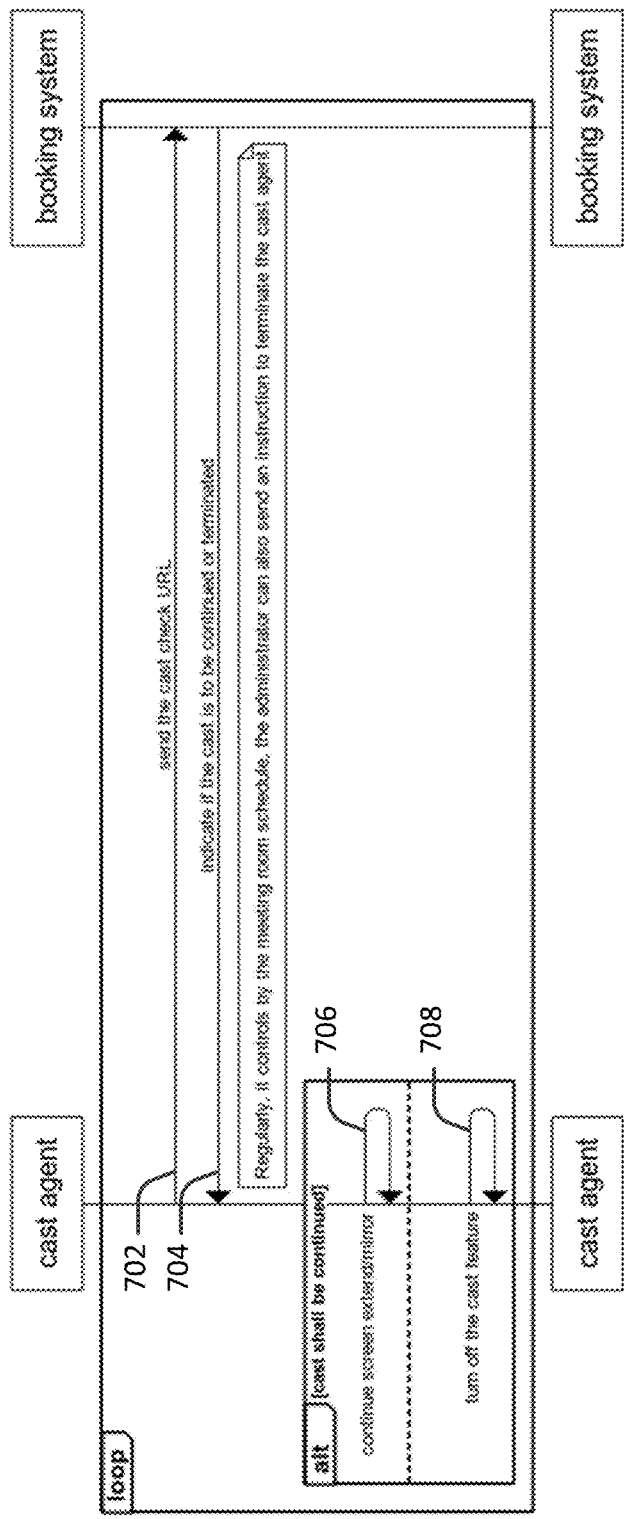
FIG. 7 illustrates an example flow of interactions between selected components to determine whether screen casting is to be continued or terminated, in accordance with an embodiment of the present disclosure.

FIG. 7 illustrates an example flow of interactions between selected components to determine whether screen casting is to be continued or terminated, in accordance with an embodiment of the present disclosure. For example, a screen casting application, such as cast agent 114, executing on a computing device may be screen casting to a display device during the use of a meeting room reserved using booking system 104. While casting to the display device, cast agent 114 continually and/or periodically sends to booking system 104 the cast check URL (702). For example, the cast check URL is used to determine whether cast agent 114 is to continue the screen cast (allow continued screen casting) or whether cast agent 114 is to terminate the screen cast. In response to the cast check URL, booking system 104 sends to cast agent 114 an indication as to whether the screen cast is to be continued or terminated (704). If the indication provided by booking system 104 is to continue the screen cast, cast agent 114 can continue to mirror the screen of the computing device to the screen of the display device (706). If the indication provided by booking system 104 is to terminate the screen cast, cast agent 114 can turn off or otherwise deactivate the screen cast feature (708) on the computing device. This results in terminating the screen cast of the screen of the computing device. For example, booking system 104 may provide an indication to terminate the screen cast if the cast check URL is received after the meeting room booking end time. In some cases, a system administrator of booking system 104 may cause the sending of an indication to terminate the screen cast. For example, the system administrator may cause booking system 104 to send an indication to terminate the screen cast even if conditions and/or circumstances indicate that the screen cast should be no longer allowed. In some cases, the system administrator may cause booking system 104 to send an indication to terminate the screen cast even if the cast check URL is received before or prior to the meeting room booking end time.

As will be further appreciated in light of this disclosure, with respect to the processes, interactions, and methods disclosed herein, the functions performed in the processes, interactions, and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect, connecting, and coupling.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A method comprising:
responsive to an activation of an access Uniform Resource Locator (URL) on a computing device,
receiving, by a booking system, information associated with a booking of a room and a display device;
generating a token for accessing the display device; and
providing to the computing device the token and an address of the display device in response to the activation of the access URL; and
responsive to receiving, by the booking system, the token from the display device, authenticating the token; and
responsive to authenticating the token, allowing use of the display device.

2. The method of claim 1, wherein allowing use of the display device includes allowing casting to a screen of the display device.

3. The method of claim 1, further comprising, responsive to receiving, by the booking system, the information associated with the booking of the room and the display device, sending to the computing device a challenge-response authentication.

4. The method of claim 3, further comprising:
receiving, by the booking system, a response to the challenge-response authentication;
determining whether the response is a valid response; and
responsive to the response being a valid response, providing to the computing device the token and an address of the display device.

5. The method of claim 4, wherein providing to the computing device the token and the address of the display device is based on a permission policy.

6. The method of claim 1, further comprising, responsive to receiving, by the booking system, the information associated with the booking of the room and the display device, providing to the computing device information regarding at least one resource associated with the meeting room, the at least one resource being different than the display device.

7. The method of claim 1, further comprising, responsive to failing to authenticate the token, disallowing use of the display device.

8. The method of claim 1, further comprising, responsive to receiving, by the booking system, the information associated with the booking of the room and the display device from the computing device,
generating a cast check URL, the cast check URL configured for use in determining whether casting to the display device is to continue; and
providing to the computing device the cast check URL.

9. The method of claim 1, wherein the access URL is generated by the booking system in response to a booking request for the room, wherein the access URL includes an access code that identifies the room reservation.

10. A non-transitory machine-readable medium encoding instructions that when executed by one or more processors cause a process to be carried out, the process comprising:
responsive to receiving information associated with a booking of a room and a display device caused by activation of an access Uniform Resource Locator (URL) on a computing device,
generating a token for accessing the display device; and
providing to the computing device the token and an address of the display device in response to the activation of the access URL; and
responsive to receiving the token from the display device, authenticating the token; and
responsive to authenticating the token, allowing use of the display device.

11. The non-transitory machine-readable medium of claim 10, wherein allowing use of the display device includes allowing casting to a screen of the display device.

12. The non-transitory machine-readable medium of claim 10, the process further comprising, responsive to receiving the information associated with the booking of the room and the display device, sending to the computing device a challenge-response authentication.

13. The non-transitory machine-readable medium of claim 12, the process further comprising:
receiving a response to the challenge-response authentication;
determining whether the response is a valid response; and
responsive to the response being a valid response, providing to the computing device the token, an address of the display device, and a cast check URL, the cast check URL configured for use in determining whether casting to the display device is to continue.

14. The non-transitory machine-readable medium of claim 10, the process further comprising, responsive to receiving the information associated with the booking of the room and the display device, providing to the computing device information regarding at least one resource associated with the meeting room, the at least one resource being different than the display device.

15. The non-transitory machine-readable medium of claim 10, the process further comprising, responsive to failing to authenticate the token, disallowing use of the display device.

16. A system comprising:
a memory; and
one or more processors in communication with the memory and configured to,
responsive to receipt of information associated with a booking of a room and a display device caused by activation of an access Uniform Resource Locator (URL) on a client application,
generate a token for accessing the display device; and provide to the client application the token and an address of the display device in response to the activation of the access URL; and responsive to receipt of the token from the display device, authenticate the token; and responsive to authentication of the token, allow casting to a screen of the display device.

17. The system of claim 16, wherein the one or more processors are further configured to, responsive to receipt of the information associated with the booking of the room and the display device, send the client application a challenge-response authentication.

18. The system of claim 17, wherein the one or more processors are further configured to, responsive to receipt of the information associated with the booking of the room and the display, receive a response to the challenge-response authentication;

determine whether the response is a valid response; and responsive to the response being a valid response, provide to the client application the token and an address of the display device.

19. The system of claim 16, wherein the one or more processors are further configured to, responsive to receipt of the information associated with the booking of the room and the display, generate a cast check URL and provide to the client application the cast check URL; and responsive to receipt of the cast check URL from the client application, one of allow continued casting to the display device or terminate casting to the display device.

20. The system of claim 16, wherein the one or more processors are further configured to, responsive to a failure to authenticate the token, disallow casting to the screen of the display device.

* * * * *